United States Patent
Wheeler et al.

(10) Patent No.: US 6,912,222 B1
(45) Date of Patent: Jun. 28, 2005

(54) PRIVATE NETWORK ACCESS POINT ROUTER FOR INTERCONNECTING AMONG INTERNET ROUTE PROVIDERS

(75) Inventors: Christopher D. Wheeler, Seattle, WA (US); Ophir Ronen, Seattle, WA (US); Benjamin J. Black, Seattle, WA (US); Michael McMillin, Seattle, WA (US); John Carlson, Seattle, WA (US)

(73) Assignee: Internap Network Services Corporation, Atlanta, GA (US)

( * ) Notice: Subject to any disclaimer, the term of this patent is extended or adjusted under 35 U.S.C. 154(b) by 0 days.

(21) Appl. No.: 09/512,127

(22) Filed: Feb. 24, 2000

Related U.S. Application Data

(63) Continuation-in-part of application No. 09/375,255, filed on Aug. 16, 1999, which is a continuation of application No. 08/922,954, filed on Sep. 3, 1997, now Pat. No. 6,009,081.

(51) Int. Cl.[7] .............................................. H04L 12/56
(52) U.S. Cl. .................................................. 370/395.31
(58) Field of Search .............................. 370/352, 353, 370/354, 355, 356, 395.2, 395.21, 395.3, 395.31, 395.32, 395.42, 395.52, 401; 709/249, 250, 251, 252

(56) References Cited

U.S. PATENT DOCUMENTS

| | | |
|---|---|---|
| 4,993,014 A | 2/1991 | Gordon |
| 5,452,294 A | 9/1995 | Natarajan |
| 5,477,536 A | 12/1995 | Picard |
| 5,548,589 A * | 8/1996 | Jeon et al. ................... 370/399 |
| 5,631,897 A | 5/1997 | Pacheco et al. |
| 5,638,377 A * | 6/1997 | Quinquis et al. ........... 370/392 |
| 5,659,542 A * | 8/1997 | Bell et al. ................... 370/496 |
| 5,675,577 A * | 10/1997 | Komatsu ..................... 370/237 |
| 5,675,741 A | 10/1997 | Aggarwal et al. |
| 5,754,547 A | 5/1998 | Nakazawa |
| 5,790,548 A | 8/1998 | Sistanizadeh et al. |
| 5,802,320 A | 9/1998 | Baehr et al. |
| 5,805,594 A | 9/1998 | Kotchey et al. |
| 5,835,710 A | 11/1998 | Nagami et al. |
| 5,845,091 A | 12/1998 | Dunne et al. |
| 5,953,338 A | 9/1999 | Ma et al. |
| 6,016,318 A * | 1/2000 | Tomoike ..................... 370/401 |
| 6,058,250 A * | 5/2000 | Harwood et al. ........... 709/227 |
| 6,097,722 A | 8/2000 | Graham et al. |
| 6,201,810 B1 * | 3/2001 | Masuda et al. ........ 370/395.32 |
| 6,219,338 B1 | 4/2001 | Weik |
| 6,243,815 B1 | 6/2001 | Antur et al. |
| 6,285,680 B1 * | 9/2001 | Steinka et al. .............. 370/431 |
| 6,807,185 B1 | 10/2004 | Bell et al. |

FOREIGN PATENT DOCUMENTS

| | | |
|---|---|---|
| WO | WO 97/50230 | 12/1997 |
| WO | WO 99/30242 A2 A3 | 6/1999 |

OTHER PUBLICATIONS

Bass, Tim, Internet Exterior Routing Protocol Development: Problems, Issues, and Misconceptions, IEEE Network, New York, US, vol. 11, No. 4, Jul. 1, 1997, (3 pages).

Tanenbaum, A.S., Routing Algorithms, Computer Networks, Englewood Cliffs, Prentice Hall, US, (11 pages).

* cited by examiner

*Primary Examiner*—Kwang Bin Yao
(74) *Attorney, Agent, or Firm*—Kilpatrick Stockton LLP

(57) ABSTRACT

A Private Network Access Point (PNAP) packet switched network is provided where two customers connected to the same PNAP exchange traffic through the PNAP without transiting over the backbones of the Internet. In addition, a multi-homed customer connected to the PNAP is provided with access to the PNAP optimized routing table so that the customer will also have the ability to know the best route for a particular destination. In this way, if a multi-homed customer connected to a particular National Service Provider (NSP) to which a destination is also connected, the PNAP customer can use the PNAP information regarding the NSP to send the information to the destination through that commonly connected NSP in the most direct fashion.

12 Claims, 4 Drawing Sheets

PRIVATE NETWORK ACCESS POINT ROUTER FOR INTERCONNECTING AMONG INTERNET ROUTE PROVIDERS

CROSS-REFERENCE TO RELATED APPLICATIONS

This application is a continuation-in-part of application Ser. No. 09/375,255 filed on Aug. 16, 1999, incorporated herein by reference, which is a continuation of Ser. No. 08/922,954 filed on Sep. 3, 1997, now U.S. Pat. No. 6,009,081, incorporated herein by reference. Priority is claimed to both applications.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to routing information packets in a network involving a plurality of traffic carrying networks, and more particularly to an improvement in routing described in U.S. Pat. No. 6,009,081.

2. Description of the Background Art

The present invention is an improvement on the invention of improvement in routing described in U.S. Pat. No. 6,009,081, and assigned to the assignee hereof. Additional background information can be found the aforesaid patent, as well as in the book entitled "Internet Routing Architectures" by Bassam Halabi, New Riders Publishing, 1997, which is hereby incorporated herein by reference.

As indicated in U.S. Pat. No. 6,009,081, column 6, lines 62–66, a PNAP or "Private Network Access Point" can be thought of as being made up of two halves. One half connects to customers. The other half connects to NSPs or "National Service Providers".

The Internet is a network of networks. A PNAP contains an ASimilater that determines the Internet interconnection matrix. ASimilater servers residing within the PNAP collect and collate the routing data received from Network Service Providers 1.1 (NSPs) to build a database of how the Internet is interconnected. The database shows the NSPs connected to the PNAP are interconnected as well as how they are connected to their customers. The PNAP receives each NSP's perspective of the Global Routing Table which, when collated, includes identical routes from multiple NSPs, and that distillation of the sum of each NSP's view of the Global Routing Table is used to direct traffic from the customer to the destination over the optimal path via another PNAP customer if available or, otherwise, one of the NSP's connected to the PNAP.

BRIEF SUMMARY OF THE INVENTION

In accordance with an aspect of the invention, if two customers who are connected to the same PNAP wish to communicate with each other, traffic will be exchanged between those customers through the PNAP without ever transiting over the backbones of the NSPs.

According to another aspect of the invention, a multi-homed customer connected to the PNAP is provided with access to the PNAP's optimized version of the Global Routing Table so that the customer will also have the ability to know the best route for a particular destination.

According to a still further aspect of the invention, if a multi-homed customer connected to the PNAP is directly connected to a particular NSP to which a destination is also connected, the PNAP customer can, based on information provided by the PNAP, send the information to the destination through that commonly connected NSP. According to another aspect of the invention, provision is made for the routing of traffic for customers who are multi-homed to multiple PNAPs in addition to one or more of the commonly connected NSPs.

A further aspect of the invention provides for routing traffic for customers who are not massively multi-homed, but are connected to more than one PNAP.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE INVENTION

Referring more specifically to the drawings, for illustrative purposes the present invention will now generally be described in connection with the seem configuration, setup and operational methodology shown in FIG. 1 through FIG. 4. It will be appreciated that the system may vary as to configuration, and that the method may vary as to the specific steps and sequence, without departing from the basic inventive concepts disclosed herein.

Figure 1:
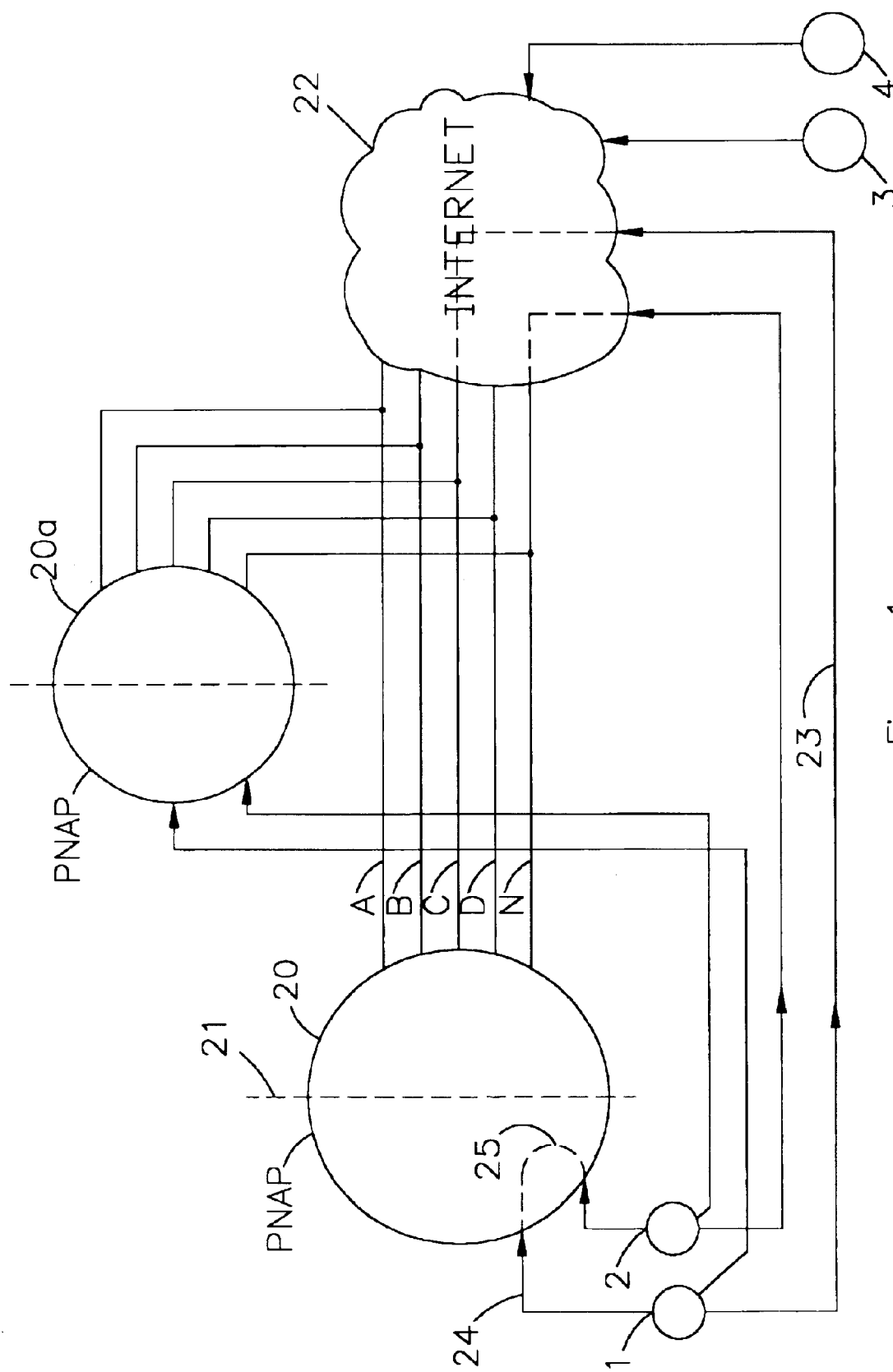
FIG. 1 is a schematic diagram showing two PNAPs with multi-homed customers according to an embodiment of the invention.

Referring first to FIG. 1, in accordance with an embodiment of the invention a first PNAP 20 and second PNAP 20a are both shown as a circle with a vertical dashed line 21 dividing it in half. While more customers would typically be connected to the PNAPs 20, 20a, the left half of the PNAPs 20, 20a are shown connected to two customers 1, 2 as an example to simplify the discussion. Furthermore, while two PNAPs 20, 20a are shown, there could be one or any other number of PNAPs. While customers 1, 2 are both shown connected to two PNAPs, a customer may be connected only to one PNAP or any other number of PNAPs. Note also in this regard, that the two customers are considered to be "multi-homed" because they are connected to more than one PNAP. In addition, customers 1, 2 each have a second link that is connected to the Internet 22. This is also considered to be a "multi-homed" configuration. It will be appreciated, however, that it is not necessary for either customer 1 or customer 2 to be multi-homed to employ all of the inventive attributes described herein. Also, while PNAP 20 will be referred to herein for simplicity, the discussion is applicable to PNAP 20a as well.

In the configuration shown, the right half of the PNAP 20 is connected to a plurality of NSPs A, B, C, D, . . . N which, in turn, form the Internet 22 to which Internet users, such as destinations 3, 4 are also connected. Note that the NSPs A–N do not exchange traffic among themselves through the PNAP 20. Traffic exchanges between NSPs A–N takes place at public or private peering points (not shown).

The customers 1, 2 typically route their traffic through the PNAP 20 from the left half to the right half. The PNAP 20 then selects the path from the customers 1, 2 to the destinations 3, 4.

From U.S. Pat. No. 6,009,081, it will be understood that the PNAP 20 contains an ASimilater that determines how everyone on the Internet 22 is connected to everyone else. Hereinafter, the term "ASimilater" will be used synonymously with the term "ASsimilator" in that patent. It will also be understood that the Border Gateway Protocol, version 4 protocol (BGP4) used therein encompasses the concept of a "Global Routing Table" which may be defined as the list of all routes visible to each provider, both of its customers as well as its peers and their customers, of everyone to which they are connected. Briefly, an ASimilater server inside the PNAP 20 receives a data "dump" of the Global Routing Table from each of its NSPs A–N, and collates the data together to build a database of how the Internet 22 is interconnected. The database shows how all of the NSPs A–N are connected together as well as connections to their customers. Once the ASimilater has populated this database, it uses the forward path or reverse path algorithm defined in U.S. Pat. No. 6,009,081 to determine which routes are NSP A's customers, which are NSP B's customers, and so on, for all of the NSPs. In effect, the ASimilater "mines" this database. To summarize:

1. The ASimilater takes a dump of the Global Routing Table from each NSP A–N.
2. The ASimilater collates the data from each NSP's perspective of the Global Routing Table.
3. The ASimilater builds a summed Global Routing Table database of the Internet 22's interconnection matrix.
4. The ASimilater determines which routes are NSP A's customers and so on for all customers and for all other NSPs B–N. As a clarification, note that each NSP is also sending routes of all other NSPs to which it is connected.

The routing table inside the PNAP 20 also maps a plurality of routes from customer 1 to customer 2 that go through the NSPs A–N.

In accordance with the present invention, if neither customer 1 nor customer 2 is multi-homed and those customers wish to communicate with each other, traffic will be exchanged between those customers through the PNAP 20 without ever transiting over the backbones of the NSPs A–N. In the case of sending information from customer 1 to customer 2, the routing table inside the PNAP 20 would list the direct connection from customer 1 to customer 2 through the left half of the PNAP 20 over the dotted path 25 as the optimum route. This means that communications between customer 1 and customer 2 who are connected to the PNAP 20 would always use the dotted path 25 as the preferred path unless a failure or flaw prevents that path from being used, in which case traffic between those customers would be exchanged through the Internet.

Figure 2:
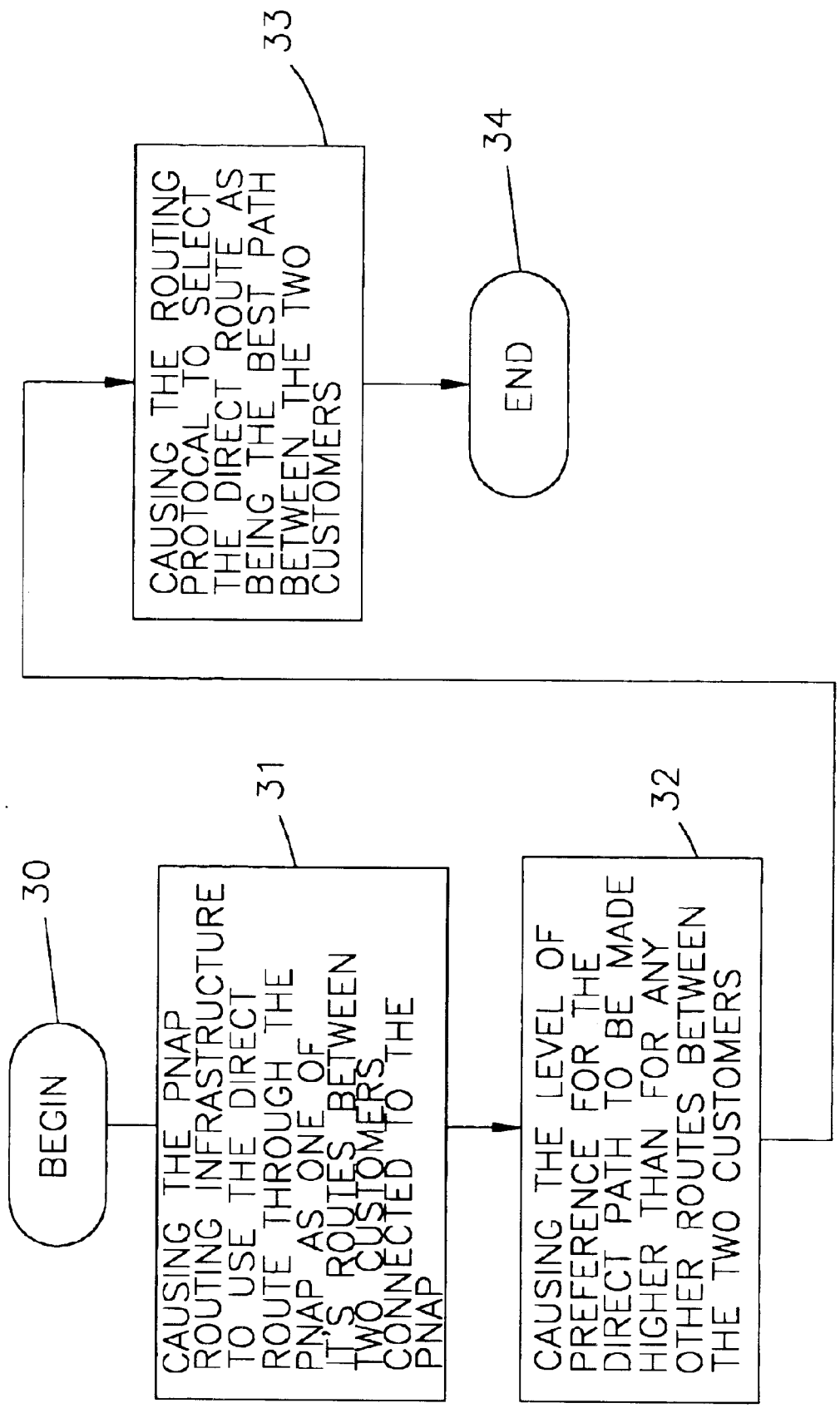
FIG. 2 and FIG. 3 are flow charts showing a method of the invention for causing traffic between two customers of the same PNAP to be exchanged through the PNAP without transiting over the Internet.
Figure 3:
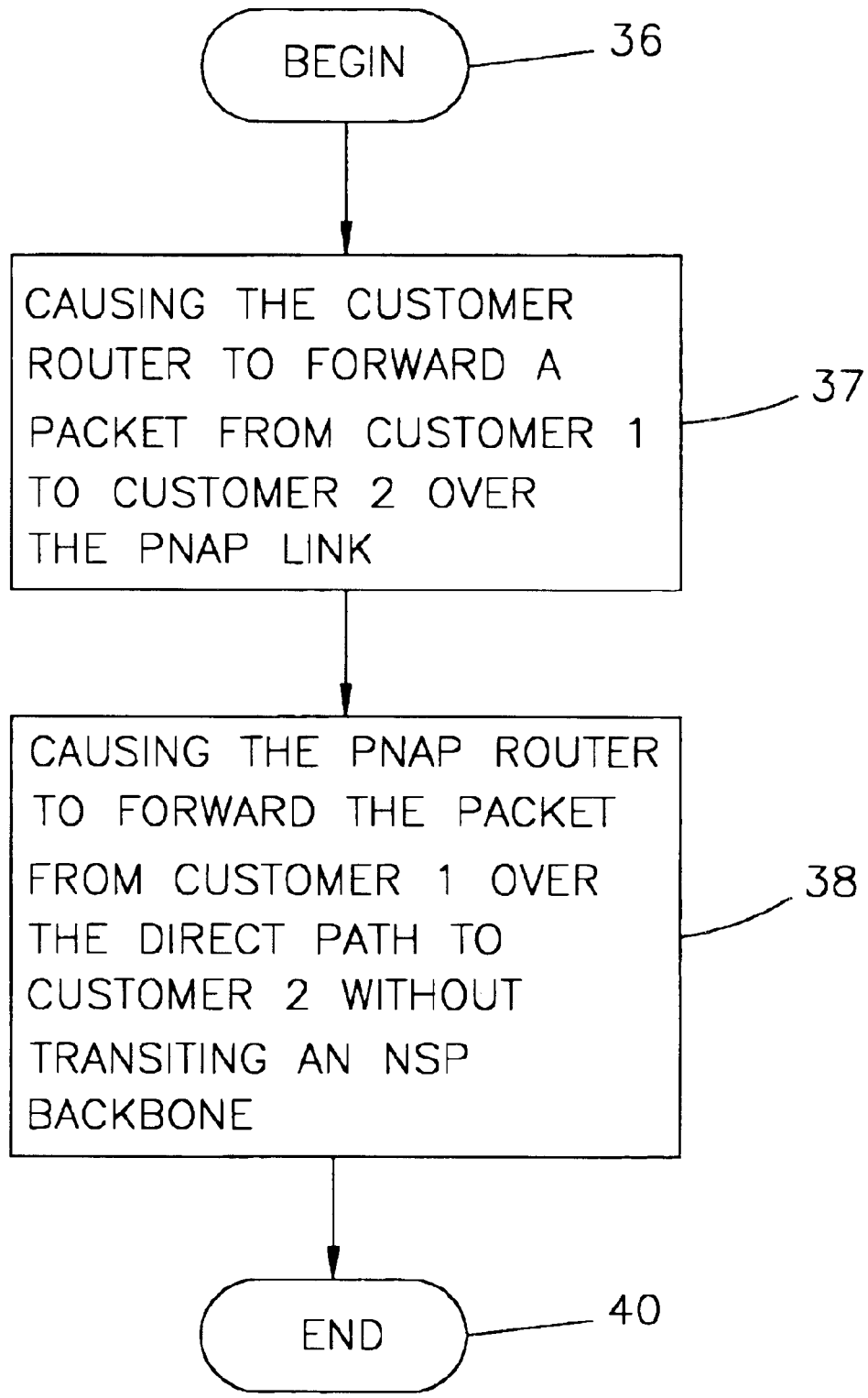

Accordingly, data packets would typically flow from customer 1 to the PNAP 20 and directly to customer 2 without traversing any of the NSPs A–N that comprise the Internet 22. This is illustrated in FIG. 2 and FIG. 3, which are method flow charts. In FIG. 2, the method begins at block 30 and proceeds to block 31 which is the step of causing the router within the PNAP to list the direct route through the PNAP as one of its routes between two customers connected to the PNAP. The step of the next block 32 is causing the level of preference for the direct path to be higher than for any other routes between the two customers. The step of the next block 33 is causing the router protocol to select the direct route as being the best path between the two customers. Finally, the last block 34 of FIG. 2 is "end". Similarly for FIG. 3, the method begins at block 36. The first step in block 37 is causing the customer router to forward a packet from customer 1 to customer 2 over the PNAP link. The next step in block 38 is causing the PNAP router to forward the packet from customer 1 over the direct PNAP path to customer 2 without transiting a service provider backbone. Finally the last block 40 of FIG. 3 is "end".

The potential for unacceptable path latency is reduced by this direct connection between customer 1 and customer 2. Path latency can, for example, result from delay between the time when a device receives a frame and the time that frame is forwarded out the destination port, or the delay caused by a shift to a more circuitous path due to an outage.

With regard to exchanging information between, for example, customers 1, 2 and destinations 3, 4, usually there will be more than one route from the customers 1, 2 to the destinations 3, 4. Therefore, the routers within the PNAP are used to forward packet traffic through the Internet 22 in an optimized fashion. The routers build routing tables that contain their distillation of the summed Global Routing Table resulting in the best paths to all the destinations from the PNAP's perspective. They both advertise and receive route information to and from other routers. The routers keep track of next hop information that enables a data packet to reach its destination. A router that does not have a direct physical connection to the destination checks its routing table and forwards the packet to its next hop; that is, a router that it is directly connected to and is closer to that destination. This process repeats until the traffic reaches its destination.

In a multi-homed configuration as shown in FIG. 1, if customer 1 wishes to send a packet to destination 3, it will see a link 23 to the Internet 22 and a link 24 to the PNAP 20. As part of the BGP4 protocol, customer 1 inherently has complete control over the outbound routing of its traffic communications in this configuration. As such, said customer may set the BGP4 local preference on the routes received by its router to destination 3 in order to cause it to prefer a particular link. For example, if destination 3 is connected to NSP D, customer 1 may set the preferences within its router to prefer link 24 based on link 24 being the optimum link. Otherwise, link 23 to NSP D may be the preferred link. However, in the event that a fault or failure appears on the preferred link, diversity considerations will cause the other link to be used instead.

In order for the customer to be able to set the preferences within its router to cause it to prefer a particular link, the customer needs routing information to know which path is optimum. Therefore, in a multi-homed configuration with the PNAP and another provider, the customer is given access to ASimilater data over its BGP feed to the PNAP. This is done so that the PNAP customer can effectively use both their PNAP and their other NSP pipe. Without the additional ASimilator data in the form of BGP communities on the customer's BGP feed from the PNAP, they are left with attempting to push traffic over the PNAP and provider pipes in a sub-optimal fashion. Again, it may be preferred for a customer to use its pipe to NSP D for communicating with destinations that are connected to NSP D and to use the PNAP (and its external connections to NSPs A–N) for all other destinations. The optimized and distilled Global Routing Table would be sent to the PNAP customer. In this example, the BGP4 attribute known as the "community" would be used to tag NSP C customer routes as determined by ASimilater with the PNAP NSP C customer community. Since the customer has complete control over outbound traffic, the customer can set the local preference in its router to tag a particular route of multiple identical routes from multiple sources as the preferred route. The higher the local preference, the more preferred the route. For example, on the inbound policy applied to the routes received from the PNAP, any routes tagged with the PNAP's community for NSP D could have their local preference set to 50 and every other route (not tagged) set to 150. On the BGP feed from NSP D, the customer could leave all routes at local preference 100 which is the default. This allows the customer to optimize their routing so that the direct pipe to NSP D is used for destinations on NSP D and the PNAP 20 is used for other destinations, thus providing effective and optimized use of both the customer's PNAP and NSP pipes based on the ASimilater information related to said customer over the PNAP BGP feed.

On the other hand, when the preferred link is over the PNAP 20 (e.g., when destination 3 is not a customer of NSP D to which customer 1 is also connected), the data packet is transmitted from customer 1 over link 24 to the left half of the PNAP 20. The PNAP routing infrastructure within the PNAP 20 will have determined a plurality of paths to destination 3. These different paths to the same destination are listed in a routing table along with a parameter indicating the degree of preference attached to each route of a set of the different paths. By manipulating the local preference component of the route selection process of the BGP4 protocol, the PNAP 20 picks the best path for the traffic to traverse to reach destination 3. The data packet leaves the right side of the PNAP 20 via the selected one of the NSPs A–N, follows the selected best path through the Internet 22, and reaches destination 3.

Therefore, in accordance with the present invention, two customers connected to the same PNAP 20 see the PNAP 20 as the best path, and exchange traffic with each other through the PNAP 20 without ever going out over the backbones of the NSPs A–N. Or, if a PNAP customer is directly connected to a particular NSP to which a destination is also connected, the PNAP customer can utilize that NSP connection to send the traffic to the destination based on the ASimilater information received over the BGP peering with the PNAP.

In the case of sending information from customer 1 to customer 2, the routing table inside the PNAP 20 would list the direct connection from customer 1 to customer 2 through the left half of the PNAP 20 over the dotted path 25 as the optimum route. This means that communications between customer 1 and customer 2 who are connected to the PNAP 20 should always use the dotted path 25 as the preferred path unless a failure or flaw prevents that path from being used.

Thus far we have described what will be referred to as "generic" Diversity+. When a PNAP customer is multihomed to more than one PNAP and one NSP, routing outbound traffic become increasingly complex. By way of additional background, the invention described in U.S. Pat. No. 6,009,081 subscribes to the model of symmetrical routing of traffic. This method allows us to bypass the public NAPs for approximately ninety percent of the traffic flowing in and out of our PNAPs with the associated benefit of much higher performance than is normal experienced in today's Internet.

The way we accomplish this symmetrical when optimal routing of traffic is by use of our routing technology called ASimilater. Each PNAP has it's own BGP AS and is completely distinct from the routing perspective of the other PNAPs with no private backbone connecting the PNAPs.

Each PNAP is, however, connected to the same fabric of NSPs as all other PNAPs. The levels of bandwidth to a PNAP may be larger or smaller depending on it's location but the fabric is the same. With that in mind, let us examine the routing of PNAP-SFJ as an example.

First, assume that each PNAP is connected to the same fabric of NSPs as all other PNAPs. Generally speaking, routing of traffic inbound from an NSP over the pipe to said NSP is easy. All of these NSPs attach a higher local preference to the routes heard from their customers over those same routes heard from their peers. Routing outbound traffic in a massively multi-homed network is much more difficult. Faced with such a multiplicity of links, the question of how to route traffic in a tightly controlled fashion is one of great importance in attaining the highest performance.

Note that we do not peer with the NSPs that we connect to, but are full transit customers of each one. This allows us to receive each NSPs perspective on the global routing table. ASimilater collates that data together and builds an interconnection matrix of the entire Internet. With that information, ASimilater can then route traffic optimally from each PNAP.

An additional function of ASimilater is to control the inter-PNAP routing. We optimize the connectivity between the PNAPs as well since we can use any of the NSPs connecting the PNAPs to route traffic between them. This allows us to choose the fastest NSP between any two PNAPs, and thus allows us to offer the optimal path between our customers and the Internet.

In the case of Diversity+, we offer our customers access to ASimilater data over their BGP feed to the PNAP 20 by use of the BGP community attribute. In other words, if a customer is connected to NSP C and a PNAP, we can offer our customer all of NSP C and NSP C's customers routes tagged with a specific community InterNAP community, in this case 6993:XXX.

That information allows our customer to route traffic destined to NSP C and NSP C customers over the NSP C link and all other traffic routed over the PNAP connection. This allows a customer to enjoy the same performance gains of symmetrical routing of traffic as PNAP even over a pipe not connected to the PNAP 20.

Figure 4:
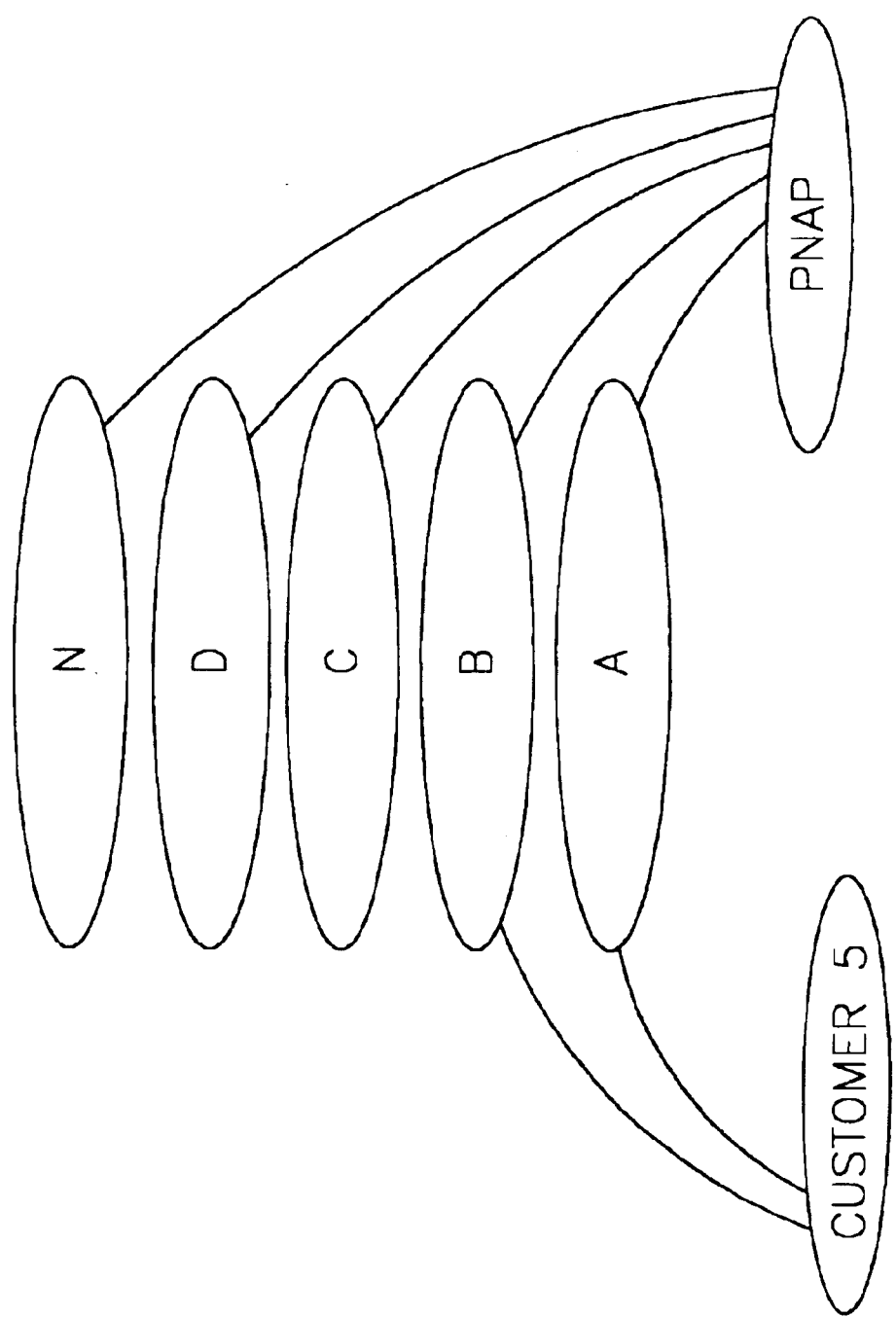
FIG. 4 is a schematic diagram of a customer multi-homed to a PNAP and a plurality of NSPs in accordance with the invention.

Referring also to FIG. 4, in the customer 5 topology there is a connection to NSP A, a connection to NSP B and a connection to InterNAP (PNAP-SFJ). In this topology, we recommend the following configuration:

(a) NSP A customer routes over the NSP A link.

(b) NSP B customer routes over the NSP B link.

(c) All others over the PNAP link.

In order for this to occur, we send the customer NSP A and NSP B routes tagged with the following communities:

NSP A: 6993:NSP A

NSP B: 6993:NSP B

For clarity, let's create the table of the local pref values to use in our IBGP.

TABLE 1

|      | NSP B | NSP A | PNAP |
|------|-------|-------|------|
| NSP B | 80   | 45    | 75   |
| NSP A | 40   | 90    | 75   |
| PNAP | 40    | 45    | 150  |

Setting the fall-through local pref values to half of the primary assists in understanding from what peer a route is being heard when perusing the BGP table. For example, in Table 1 all NSP A routes are assigned a local pref of 90 and all of the other routes heard from NSP A are assigned a local pref of 45. If you were to see a route tagged at a local pref of 45 in your IBGP, that would signify a non-NSP A route announced to the customer over the customer's BGP peering with NSP A.

The net effect of this local pref hierarchy is that of the routes that we know are not NSP B or NSP A, highest local pref wins on the PNAP link. The fall-through local pref value is used in the case of multiple routes heard over >1 of your connections. Multi-homed customers of the PNAP, NSP A, and NSP B would use the PNAP and, if that link was not available, the NSP A link followed by NSP B. Multi-homed customers of NSP B and NSP A would, in the example above, use NSP A followed by NSP B.

Whether using NSP A or NSP B in the case of a multi-homed customer of both is entirely at the customer's discretion. That behavior is easily modifiable by switching the primary and fall-through local pref sets of NSP A and NSP B.

EXAMPLE 1

The following is an example of implementing this approach with NSP A.
NSP A peer:
  neighbor xxx.xxx.xxx.xxx remote-as
  neighbor xxx.xxx.xxx.xxx send-community
  neighbor xxx.xxx.xxx.xxx remote-as NSP A
  neighbor xxx.xxx.xxx.xxx version 4
  neighbor xxx.xxx.xxx.xxx distribute-list 1 out
  neighbor xxx.xxx.xxx.xxx route-map NSP A-IN in
  neighbor xxx.xxx.xxx.xxx route-map NSP A-OUT out
  neighbor xxx.xxx.xxx.xxx filter-list 1 out
  spr-bgw-02#
  ip as-path access-list 1 permit A$
  ip as-path access-list 2 permit .*
  ip as-path access-list 10 deny ^NSP A_NSP B_.*
  ip as-path access-list 10 deny ^NSP A_XXXX_.
  route-map NSP A-OUT permit 10
    ! only allow customer 5 IBGP sourced routes
    match as-path 1
  route-map NSP A-IN permit 10
    ! let's start by denying all routes we know are NSP B
      and PNAP-SEA
    ! and attaching a medium primary local pref.
    match as-path 10
    set local-preference 90
  route-map NSP A-IN permit 20
    ! Any other routes attach a medium fall through local pref match as-path 2
    set local-preference 45

Intermap Router:
  neighbor xxx.xxx.xxx.xxx remote-as XXXXX
  neighbor xxx.xxx.xxx.xxx send-community
  neighbor xxx.xxx.xxx.xxx version 4
  neighbor xxx.xxx.xxx.xxx distribute-list 1 out
  neighbor xxx.xxx.xxx.xxx route-map PNAP-IN in
  neighbor xxx.xxx.xxx.xxx route-map PNAP-OUT out
  neighbor xxx.xxx.xxx.xxx filter-list 1 out
ip community-list 1 deny 6993:NSP A; deny NSP A routes
ip community-list 1 deny 6993:NSP B; deny NSP B routes
ip as-path access-list 1 permit ^$
ip as-path access-list 2 permit .*
route-map PNAP-OUT permit 10
  ! only allow customer 5 IBGP sourced routes
  ! this is already being accomplished by the distribute-list
  ! out but this routemap is where you can adjust your AS
  ! prependings.
  match as-path 1
route-map PNAP-IN permit 10
  ! any routes that we know are not NSP B, or NSP A tag highest
  ! primary local pref
  match community 1
  set local-preference 150
route-map PNAP-IN permit 20
  ! all else (NSP A, and NSP B routes) tag highest
fall through
  ! local pref
  ! all else (NSP A, and NSP B routes) tag highest fall
through
  ! local pref
  match as-path 2
  set local-preference 75
NSP B Router:
  neighbor 144.228.98.5 remote-as NSP B
  neighbor 144.228.98.5 version 4
  neighbor 144.228.98.5 distribut-list 1 out
  neighbor 144.228.98.5 route-map NSP B-IN in
  neighbor 144.228.98.5 route-map NSP B-OUT out
  neighbor 144.228.98.5 filter-list 1 out
ip as-path access-list 1 permit ^$
ip as-path access-list 2 permit .*
ip as-path access-list 10 deny ^NSP B_XXXXX_.*
ip as-path access-list 10 deny ^NSP B_NSP A_.*
ip as-path access-list 10 deny ^NSP B_1664_.*
route-map NSP B-OUT permit 10
  ! only allow customer 5 IBGP sourced routes
  ! this is already being accomplished by the distribute-list
  ! out but this routemap is where you can adjust your AS
  ! prependings.
  match as-path 1
route-map NSP B-IN permit 10
  ! deny all NSP A, and PNAP routes and set a low
  primary local pref
  match as-path 10
  set local-preference 80
!
route-map NSP B-IN permit 20
  ! All else tag with a lowest fall through local pref.
  match as-path 2
  set local-preference 40

There is another configuration which also requires special consideration; namely, where a multi-homed PNAP customer with generic Diversity+ is connected to more than one PNAP.

The local-preference hierarchy of generic Diversity+ is intended to address the problem of multi-PNAP routing by creating an interlocking set of preference steps for path selection. In its default configuration, generic Diversity+ supports up to two PNAP transit connections and multiple, other NSP transit connections.

Each primary level of local-preference has a corresponding secondary value used as a backup should the primary become invalid. The complete hierarchy is shown below.

Generic Diversity+ Local Preference Hierarchy
(Default)

400 PNAP Direct Customer High (Primary Link)
350 PNAP Direct Customer Low (Secondary Link)
300 Primary PNAP Direct NSP
250 Secondary PNAP Direct NSP
200 Primary PNAP Non-connected
150 Secondary PNAP Non-connected
100 Default Local Preference Value
90 Primary PNAP Direct NSP Backup
80 Secondary PNAP Direct NSP Backup
70 Primary PNAP Non-connected Backup
60 Secondary PNAP Non-connected Backup This hierarchy is applied as follows:

For customers with no more than one link to a given PNAP, routes to customers of that PNAP are set to 400. When a customer has single links to multiple PNAPs, the value is still set to 400 and the length of the AS path is left to break the tie, meaning the direct link to the PNAP sourcing those customer routes will be used as the AS path will be shorter.

If a customer has multiple links to the same PNAP, then routes over the primary link to customers of that PNAP will be set to 400, while routes over the secondary link to those same customer routes will be set to 350.

Routes belonging to NSPs and their customers directly connected to the primary PNAP are set to 300, while routes belonging to NSPs and their customers directly connected to the secondary PNAP are set to 250. This results in traffic being sent through the primary PNAP if the primary PNAP has a given NSP in its border fabric. If the secondary PNAP has an NSP in its border fabric not common to the primary PNAP, or if an NSP common to them both fails at the primary, the traffic will be sent through the secondary for those destinations.

For destinations within NSPs which are not part of the border fabric of the primary PNAP routes are set to 200. Similar routes from the secondary PNAP are set to 150.

Should an NSP connection at the primary PNAP fail, routes to that NSP through the primary PNAP will be set to 200, rather than 300. If an NSP connection at the secondary PNAP fails, routes to that NSP through the secondary PNAP will be set to 150, rather than 250.

The default value of 100 is generally not used for routes through a PNAP and is instead allocated for cases in which a customer has a connection to another NSP in addition to a PNAP.

The values below 100 are used for customer NSP routes heard through the PNAP. The routes heard via the primary PNAP from the NSP to which the customer has a direct connection are set to 90. The same routes heard from the secondary PNAP are set to 80. Both of these cases assume the PNAPs have the NSP in their border fabric.

If the customer has a connection to an NSP not found in the border fabric of the primary PNAP, those routes heard through the primary PNAP for destinations within that NSP are set to 70. If such is the case with the secondary PNAP, those routes are set to 60.

Determining Primary and Secondary

In a simple multi-PNAP scenario, a customer is connected to more than one PNAP in a given city or region and the primary and secondary PNAPs can be determined based on traffic levels within the PNAPs, provider fabric, or other concerns. However, when the multiple PNAPs are not all geographically close, a simple primary/secondary configuration may result in sub-optimal routing both in and out of the customer network.

In cases when a customer is connected to multiple, geographically diverse PNAPs the preferred configuration is to have multiple primaries, one per region. In this way, PNAP NSPs will use their IGP cost for inbound traffic and the customer can similarly use their own IGP cost for outbound traffic. Care must be taken to properly announce prefixes to control regional traffic flows. Customers with such disperse PNAP connectivity should announce both their aggregate networks as well as more specific, regional prefixes.

As an example, consider a customer with sites in both LAX and NYC with their own backbone connection between them. Each site connects to one PNAP in their area. The customer has been allocated 192.168.0.0/16 and has internally allocated 192.168.0.0/17 for the LAX site and 192.168.128.0/17 for the NYC site. From the LAX PNAP they would announce both 192.168.0.0/16 and 192.168.0.0/17. From the NYC PNAP they would announce both 192.168.0.0/16 and 192.168.128.0/17. If the customer wished to avoid any traffic to or from external destinations from transiting their backbone, they would instead advertise only the more specific prefixes (192.168.0.0/17 and 192.168.128.0/17) and not the aggregate (192.168.0.0/16).

This multiple primary PNAP model can be extended to an arbitrary number of regions, but within a single region, there must be a single primary.

EXAMPLE 2

Configuration for a Multi-PNAP Customer

In the example below assume the customer is connected to two PNAPs, A and B. A is the primary, with connections to NSP C, NSP D, while B is the secondary, with connections to NSP C, NSP D, and NSP E.

PNAP Data for Customer Configuration:
PNAP A
Autonomous System Number: XXXXX
Border 1 Next Hop: 10.8-28.230.1
Internal/Customer Networks: 10.8.0.0/16
   192.168.4.0/24 (AS 12005)
   192.168.16.0120 (AS 5507)
NSP Fabric: NSP D (AS 1239)
   NSP C (AS 701)
PNAP B
Autonomous System Number: 6993
Border 2 Next Hop: 172.18.24.33
Internal/Customer Networks: 172.18.0.0/16
   172.20.4.0/22 (AS 13461)
NSP Fabric: NSP D (AS 1239)
   NSP C (AS 701)
   NSP E (AS 3561)

EXAMPLE 3

BGP Routes Selected at Customer

Customer-CPE>sho ip bgp
BGP table version is 3063602, local router ID is 10.8.230.2
Status codes: s suppressed, d damped, h history, * valid, >best, i—internal Origin codes: i—IGP, e—EGP, ?—incomplete

| Network | Next Hop | Metric | LocPrf | Weight | Path |
|---|---|---|---|---|---|
| *>i9.2.0.0/16 | 10.8.230.1 | 0 | 300 | 0 | XXXXX XXX i |
| * | 172.18.24.33 | 0 | 250 | 0 | 6993 XXX i |
| *>i10.8.0.0/16 | 10.8.230.1 | 0 | 400 | 0 | XXXXX i |
| * | 172.18.24.33 | 0 | 150 | 0 | 6993 1239 XXXXX i |
| * 24.116.4.0/23 | 10.8.230.1 | 0 | 200 | 0 | XXXXX 1239 3561 i |
| *>i | 172.18.24.33 | 0 | 250 | 0 | 6993 3561 i |
| *>i137.99.0.0 | 10.8.230.1 | 0 | 200 | 0 | XXXXX 1239 209 i |
| * | 172.18.24.33 | 0 | 150 | 0 | 6993 1239 209 i |
| * 172.18.0.0 | 10.8.230.1 | 0 | 200 | 0 | XXXXX XXX 6993 i |
| *>i | 172.18.24.33 | 0 | 400 | 0 | 6993 i |
| * 172.20.4.0/22 | 10.8.230.1 | 0 | 200 | 0 | XXXXX XXX 6993 13461 i |
| *>i | 172.18.24.33 | 0 | 400 | 0 | 6993 13461 i |
| *>i192.168.4.0 | 10.8.230.1 | 0 | 400 | 0 | XXXXX 12005 i |
| * | 172.18.24.33 | 0 | 150 | 0 | 6993 1239 XXXXX 12005 i |
| >i192.168.16.0/20 | 10.8.230.1 | 0 | 400 | 0 | XXXXX 5507 i |
| * | 172.18.24.33 | 0 | 150 | 0 | 6993 1239 XXXXX 5507 1 |

Detail of BGP Route Information for Specific Prefixes

Customer-CPE>sho ip bgp 10.8.0.0
BGP routing table entry for 10.8.0.0116, version 1304669
Paths: (2 available, best #2)
  6993 1239 XXXXX
    172.18.24.33 from 172.18.24.33 (172.18.24.1)
      Origin IGP, metric 0, localpref 150, valid, external
  XXXXX
    10.8.230.1 from 10.8.230.1 (10.8.230.1)
      Origin IGP, metric 0, localpref 400, valid, external, best
Customer-CPE<sho ip bgp 137.99.00
BGP routing table entry for 137.99.0.0, version 1304669
Paths: (2 available, best #2)
  6993 1239 209
    172.18.24.33 from 172.18.24.33 (172.18.24.1)
      Origin IGP, metric 0, localpref 150, valid, external
  XXXXX 1239 209
    10.8.230.1 from 10.8.230.1 (10.8.230.1)
      Origin IGP, metric 0, localpref 200, valid, external, best Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A packet-switched network, comprising:
   a Private Network Access Point (PNAP) having a customer side and a service provider side;
   at least a first customer and a second customer connected to the customer side of the PNAP;
   at least one service provider connected to the service provider side of the PNAP; and
   an interconnected network system connected to said service provider and to said first and second customers;
   wherein said first customer is connected to a service provider who is also connected to the service provider side of the PNAP so that said first customer is multi-homed;
   wherein said multi-homed customer is provided a routing table listing a plurality of routes to a plurality of destinations in the network, along with a community attribute denoting a preferred reachability of a given route through the service provider;
   wherein said multi-homed customer can utilize ASimilater data received over a Border Gateway Protocol (BGP) feed from the PNAP and send traffic to a destination served by said service provider through said multi-homed customer's connection to said service provider by using said routing table to set route preferences in a router maintained by said multi-homed customer; and
   wherein traffic between said first and second customers is exchanged through the PNAP without transiting over said service provider.

2. A network as recited in claim 1, wherein the PNAP routing infrastructure within said PNAP contains a routing table listing a plurality of routes to a plurality of destinations in the network, along with a parameter indicating the degree of preference attached to each route of a set of identical routes from multiple sources.

3. A network as recited in claim 1, wherein said PNAP routing infrastructure lists a direct connection between said first and second customers within said customer side of the PNAP, and wherein said PNAP routing infrastructure sets the level of preference higher for said direct connection than for any other routes between said first and second customers.

4. A packet-switched network, comprising:
   a Private Network Access Point (PNAP) having a customer side and a service provider side;
   at least a first customer and a second customer connected to the customer side of the PNAP;
   a plurality of service providers connected to the service provider side of the PNAP; and
   an interconnected network system connected to said plurality of service providers and to said first and second customers;
   wherein a PNAP routing infrastructure within said PNAP contains a routing table listing a plurality of routes to a plurality of destinations in the network, along with a parameter indicating a degree of preference attached to each route;
   wherein said PNAP routing infrastructure lists a direct connection between said first and second customers within said customer side of the PNAP;
   wherein said first customer is connected to a service provider who is also connected to the service provider side of the PNAP so that said first customer is multi-homed;
   wherein said multi-homed customer is provided with said routing table along with a community attribute denoting a preferred reachability of a given route through the connection to the service provider; and
   wherein said multi-homed customer can utilize ASimilater data received over a Border Gateway Protocol (BGP) feed from the PNAP and send traffic to a destination served by said service provider through said multi-homed customer's connection to said service provider by using said routing table to set route preferences in a router maintained by said multi-homed customer.

5. A network as recited in claim 4, wherein said PNAP routing infrastructure sets the level of preference higher for said direct connection than for any other routes between said first and second customers.

6. A network as recited in claim 4, wherein traffic between said first and second customers is exchanged through the PNAP without transiting over said service provider.

7. A method for exchanging traffic in a packet-switched network, comprising:
   providing a Private Network Access Point (PNAP) having a customer side and a service provider side,
   wherein at least a first customer and a second customer are connected to the customer side and at least one service provider is connected to the service provider side, wherein the first customer, the second customer and the service provider are connected to an interconnected network system, and wherein said first customer is connected to a service provider who is also connected to the service provider side of the PNAP so that said first customer is multi-homed;
   providing said multi-homed customer with a routing table listing a plurality of routes to a plurality of destinations in the network, along with a community attribute denoting a preferred reachability of a given route through the connection to the service provider:
   allowing said multi-homed customer to utilize ASimilater data received over a Border Gateway Protocol (BGP) feed from the PNAP and send traffic to a destination served by said service provider through said multi-homed customer's connection to said service provider by using said routing table to set route preferences in a router maintained by said multi-homed customer; and
   causing traffic between said first and second customers to be exchanged through the PNAP without transiting over said service provider.

8. A method as recited in claim 7, wherein a PNAP routing infrastructure within said PNAP contains a routing table listing a plurality of routes to a plurality of destinations in the network, along with a parameter indicating a degree of preference attached to each route.

9. A method as recited in claim 7, wherein said PNAP routing infrastructure lists a direct connection between said first and second customers within said customer side of the PNAP.

10. A method as recited in claim 9, wherein said PNAP routing infrastructure sets the level of preference higher for said direct connection than for any other routes between said first and second customers.

11. A packet-switched network, comprising:
    a Private Network Access Point (PNAP) having a customer side and a service provider side;
    at least one customer connected to the customer side of the PNAP;
    at least one service provider connected to the service provider side of the PNAP; and
    an interconnected network system accessible to said service provider and to said customer;
    wherein said customer is connected to a service provider who is also connected to the service provider side of the PNAP so that said customer is multi-homed;
    wherein said multi-homed customer is provided a routing table listing all routes to all destinations in the network, along with a community attribute denoting the preferred reachability of a given route over the customer non-PNAP connection; and
    wherein said multi-homed customer can utilize the ASimilater data received over the BGP feed from the PNAP and send traffic to a destination served by said service provider through said customer's connection to said service provider by using said routing table to set route preferences in a router maintained by said customer.

12. A method for exchanging traffic in a packet-switched network, comprising:
    providing a Private Network Access Point (PNAP) having a customer side and a service provider side;
    connecting at least one customer to the customer side of the PNAP;
    connecting at least one service provider to the service provider side of the PNAP;
    making an interconnected network system accessible to said service provider and to said customer;

wherein said customer is connected to a service provider who is also connected to the service provider side of the PNAP so that said customer is multi-homed;

providing said multi-homed customer a routing table listing all routes to all destinations in the network, along with a community attribute denoting the preferred reachability of a given route over the customer non-PNAP connection; and allowing said multi-homed customer to utilize the ASimilater data received over the BGP feed from the PNAP and send traffic to a destination served by said service provider through said customer's connection to said service provider by using said routing table to set route preferences in a router maintained by said customer.

* * * * *